United States Patent

Morrison

[15] 3,650,405
[45] Mar. 21, 1972

[54] APPARATUS FOR CHLORINATING SWIMMING POOLS

[72] Inventor: Robert L. Morrison, 18219 Van Ness Ave., Torrance, Calif. 90504

[22] Filed: Oct. 2, 1969

[21] Appl. No.: 863,104

[52] U.S. Cl. ..................210/241, 210/62, 210/169, 210/199, 222/6, 261/23 R, 261/122
[51] Int. Cl. ..........................................C02b 1/36
[58] Field of Search ..................210/59-62, 198, 210/169, 241, 220, 199, 63, 50, 206; 222/6; 261/23 R, 122

[56] References Cited

UNITED STATES PATENTS

| 1,813,827 | 7/1931 | Swearingen | 210/220 X |
| 2,095,473 | 10/1937 | Keunecke | 261/122 X |
| 2,226,958 | 12/1940 | Zahm et al. | 261/122 X |
| 2,623,014 | 12/1952 | Kloth | 210/169 X |
| 3,012,676 | 12/1961 | Englesberg | 210/241 X |
| 1,285,497 | 11/1918 | Wallace et al. | 222/6 |

OTHER PUBLICATIONS

Journal American Water Works Association, Vol. 55, No. 9, Sept. 1963, page 1,208.
Derby, R. L., Chlorination of Deep Reservoirs, etc., Jour. AWWA, Vol. 48, July 1956, pp. 775-780

*Primary Examiner*—Michael Rogers
*Attorney*—Flehr, Hohbach, Test, Albritton and Herbert

[57] ABSTRACT

Portable apparatus for treating swimming pool water with chlorine gas wherein a source of chlorine gas is connected to a dispersion head adapted for introducing gas into water in the form of small bubbles. A source of carbon dioxide is also connected to the dispersion head, and valves are provided for successively delivering chlorine gas and carbon dioxide to the head for chlorinating the water and purging the system of chlorine gas.

5 Claims, 6 Drawing Figures

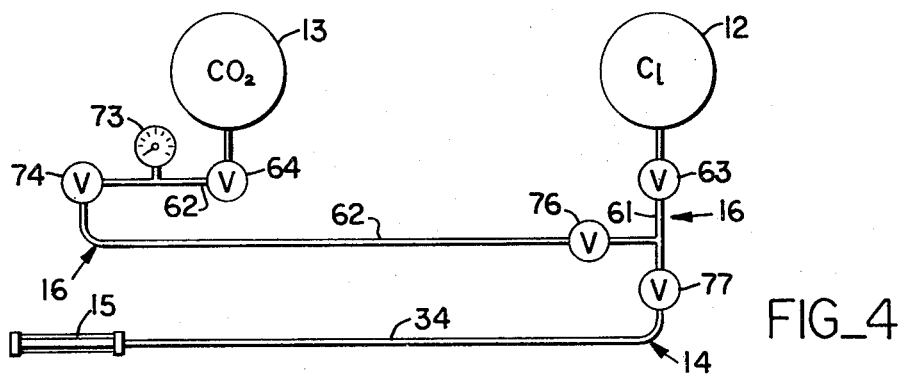
FIG_4
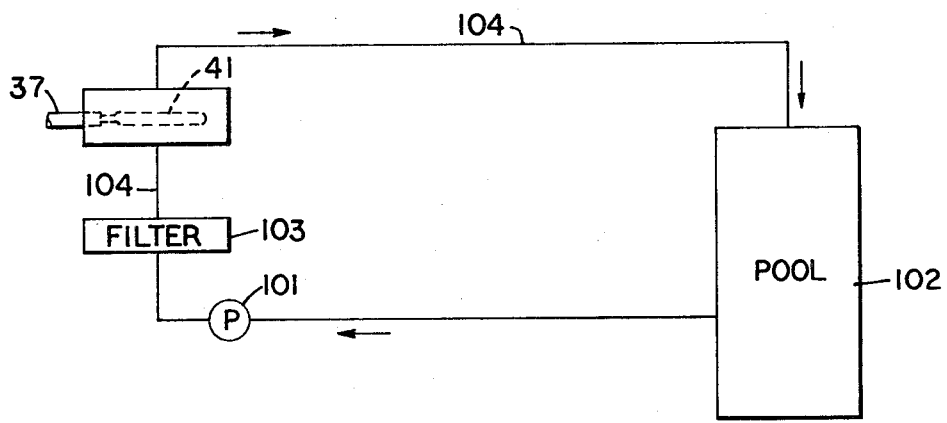
FIG_5
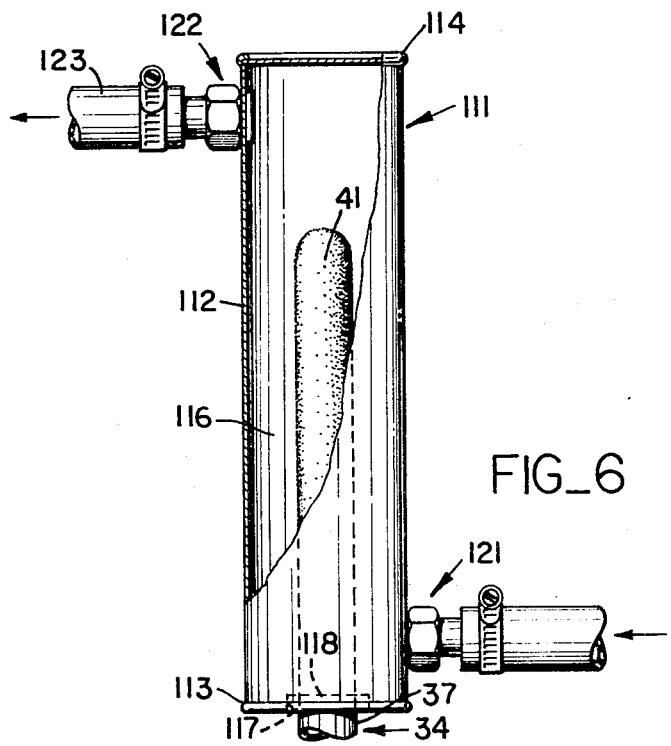
FIG_6
INVENTOR.
ROBERT L. MORRISON
ATTORNEYS PATENTED MAR 21 1972 3,650,405
SHEET 2 OF 2
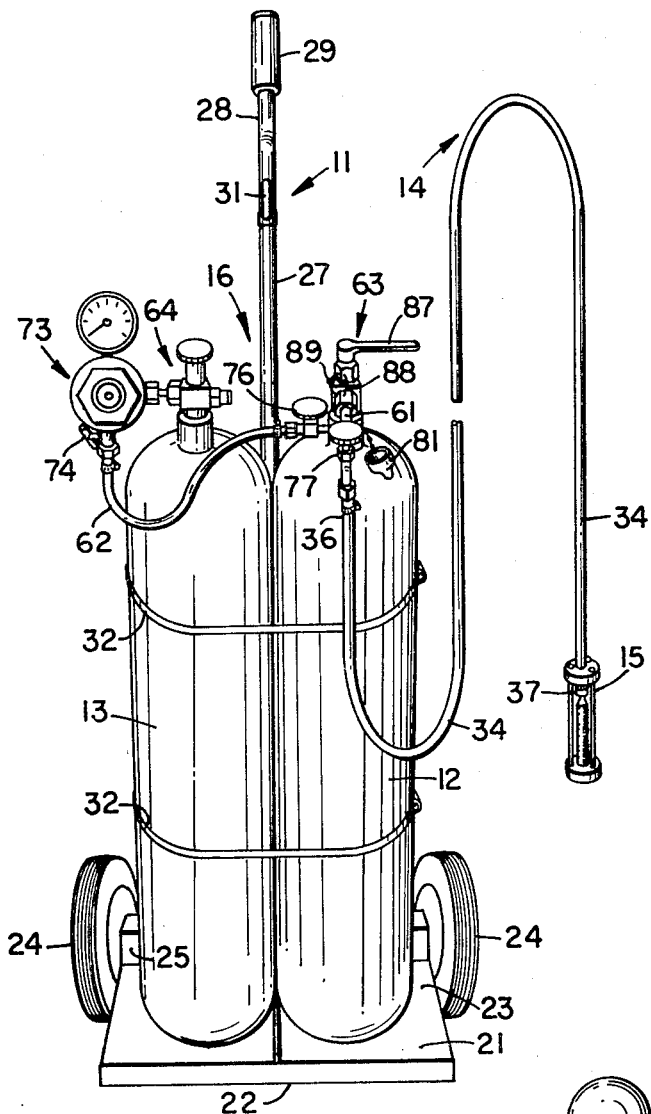
FIG_1
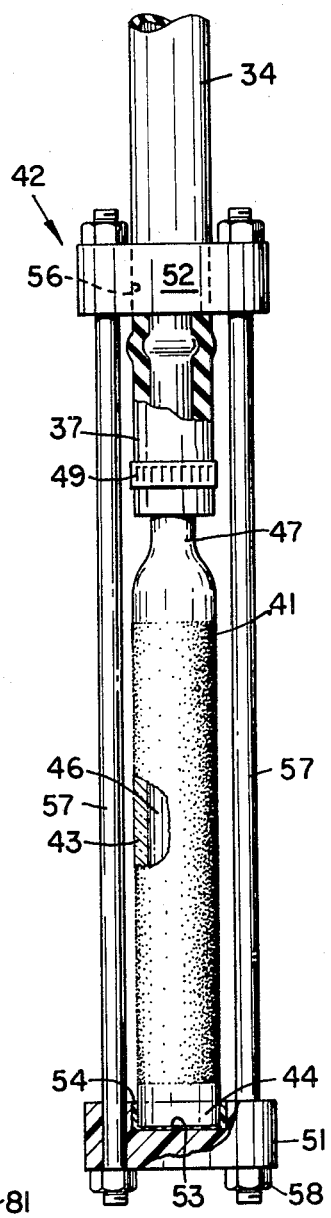
FIG_2
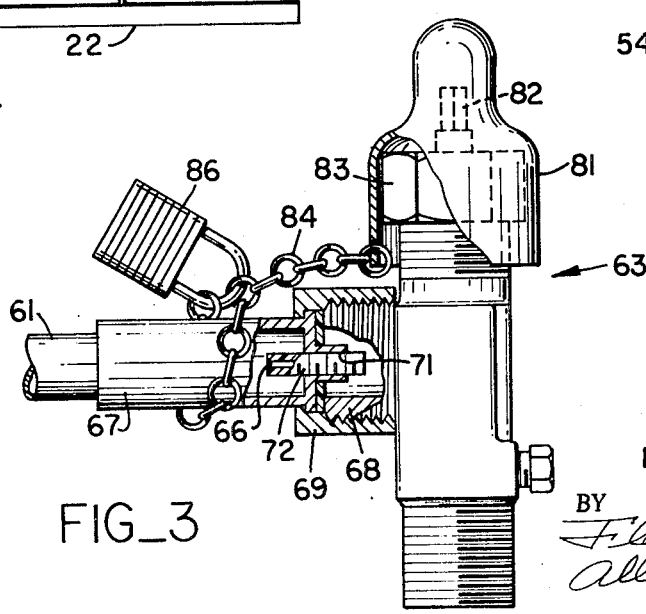
FIG_3
INVENTOR.
ROBERT L. MORRISON
BY Filchr, Hohbach, Test,
Albritton & Herbert
ATTORNEYS

APPARATUS FOR CHLORINATING SWIMMING POOLS

BACKGROUND OF THE INVENTION

This invention pertains generally to the treatment of water in swimming pools and more particularly to apparatus for adding chlorine gas to swimming pool water.

Chlorine is widely used for treating swimming pool water to destroy algae and germs and to maintain the water free of such contamination. Home owners commonly add chlorine to their swimming pools in the form of liquid, or granular chlorine compounds such as calcium hypochlorite, sodium hypochlorite, or other organic chlorides. These compounds include an alkaline carrier for the chlorine. In order to maintain the proper pH balance in the pool, it is necessary to add an acid to the water at the same time the chlorine compound is added to neutralize the alkaline carrier. The alkaline carriers tend to cause the formation of undesirable scale on the walls on the pool, and some contain large amounts of iron impurities which discolor the plaster in the pool. The commercial grade acids used also contain iron impurities which stain the walls of the pool.

Chlorine gas is generally recognized as a more desirable form than the aforementioned chlorine compounds for adding chlorine to a swimming pool. When chlorine gas is used, there is no carrier and, therefore, no scale formation occurs, and no acid is required. Also there is no problem in maintaining the proper pH balance in the pool when chlorine gas is used in the prescribed amounts. In addition, chlorine gas is less expensive than the chlorine compounds. However, the methods heretofore used for introducing chlorine gas into a swimming pool have required elaborate and expensive equipment which is generally not available to home owners. There is, therefore, a need for new and improved apparatus for treating swimming pool water with chlorine gas.

SUMMARY AND OBJECTS OF THE INVENTION

The present invention provides apparatus for safely introducing chlorine gas into a swimming pool. This apparatus is particularly suitable for use by home owners. The system includes a source of chlorine gas connected to a dispersion head which is adapted for submersion in water and for introducing gas into the water in the form of small bubbles. A source of carbon dioxide is also connected to the dispersion head, and valves are provided for successively delivering chlorine gas and carbon dioxide to the dispersion head for, respectively, chlorinating the water and purging the dispersion head of chlorine gas. In one embodiment, the sources of chlorine gas and carbon dioxide are mounted on a small portable dolly, and the dispersion head is connected to the sources by means of a long flexible hose to provide a readily portable unit in which the dispersion head can be placed directly in the swimming pool. In a second embodiment, the dispersion head is mounted in the return line between the filter and the pool. In another embodiment, the dispersion head is mounted in a container through which fresh water is passed for delivery to the pool.

It is in general an object of the present invention to provide new and improved apparatus for chlorinating swimming pool water with chlorine gas.

It is another object of the invention to provide apparatus of the above character which is simple, safe, and economical.

Another object of the invention is to provide apparatus of the above character which includes means for purging the system of chlorine gas following the chlorination operation.

Another object of the invention is to provide apparatus of the above character which is readily portable.

Another object of the invention is to provide apparatus of the above character which can be connected in a conventional swimming pool filter system.

Additional objects and features of the invention will be apparent from the following description in which the preferred embodiments are set forth in detail in conjunction with the accompanying drawing.

BRIEF DESCRIPTION OF THE DRAWING

FIG. 1 is a perspective view of the one embodiment of a portable system incorporating the present invention.

FIG. 2 is an enlarged elevational view, partially sections, of the dispersion head used in the embodiment illustrated in FIG. 1.

FIG. 3 is an elevational view, partially sectioned, of a valve for controlling the flow of gas from a chlorine source of the type illustrated in FIG. 1.

FIG. 4 is a diagrammatic illustration of the gas-flow components of one embodiment of the invention.

FIG. 5 is a diagram illustrating the connection of one embodiment of the invention in the conventional filter system of a swimming pool.

FIG. 6 is an elevational view, partially sectioned, of an embodiment of the invention which is particularly adapted for adding chlorine gas to fresh water to be delivered to a swimming pool.

DESCRIPTION OF THE PREFERRED EMBODIMENTS

The portable embodiment illustrated in FIG. 1 includes a dolly 11, a source of chlorine gas 12, a source of carbon dioxide 13, delivery tube 14 including a dispersion head 15, and distribution means for controlling the flow of chlorine and carbon dioxide to the delivery tube and dispersion head.

The dolly 11 can be a conventional two-wheeled hand dolly, adapted for resting in a generally upright position, as illustrated in FIG. 1. This dolly includes a generally horizontal platform member 21 adapted for supporting the sources 12 and 13 when the dolly is in its upright position. The front portion 22 of the platform member is adapted for resting upon the ground, and the rear portion 23 is suspended from an axle, not shown, upon which a pair of wheels 24 are mounted. A retaining member 25 is provided at the rear portion of the platform member for retaining the sources 12 and 13 on the dolly when the dolly is inclined from its upright position.

An elongate member 27 extends vertically upward from the platform member 21. The upper portion 28 of the member 27 extends rearwardly of the platform member and is provided with a conventional grip 29, thereby forming a handle for the dolly. A hanger 31 is attached to the upright member proximate its upper end. When the system is not in use, the delivery tube 14 is coiled up and hung over this hanger. Straps 32 extend around the sources 12 and 13 and the upward member 27 to provide means for securing the sources on the dolly. If desired, additional members similar and parallel to the retaining member 25 can be rigidly attached to the upright member 27 to provide additional support for the sources.

The source 12 is a conventional tank or bottle containing liquid chlorine and chlorine gas under a pressure on the order of 60 to 150 p.s.i. The source 13 is a conventional tank or bottle containing liquid carbon dioxide and carbon dioxide gas under a pressure on the order of 800 p.s.i. The carbon dioxide is used as a flushing fluid for purging the system of chlorine gas, and if desired, fluids other than carbon dioxide can be used for this purpose. It is desirable that such fluids be noncorrosive and nonoxydizing and that they not be violently reactive with chlorine gas. Suitable fluids include nitrogen, air, and other inert gases. In addition, halogenated hydrocarbons having at least one fluorine atom per molecule can be used. Such hydrocarbons are commonly designated by the trademark Freon.

Carbon dioxide is beneficial to the chemistry of the swimming pool in that it greatly aids in maintaining the acid-alkali balance in the pool. In addition, the carbon dioxide inside the bottle or tank is liquid in form, which permits the pressure within the tank to remain relatively constant. This permits a simple regulator to be used in conjunction with the carbon dioxide source.

The delivery tube 14 includes an elongate flexible hose 34 having an inlet end 36 and a discharge end 37. The inlet end 36 is adapted for connection to the sources of chlorine gas and carbon dioxide, and the discharge end 37 is connected to the dispersion head 15.

As can be seen most clearly in FIG. 2, the dispersion head 15 includes a generally cylindrical dispersion element 41 mounted in an external framework 42. The element 41 includes an annular side wall 43 and an end wall 44, defining an internal chamber 46. The chamber 46 is in open communication with the hose 34 at the end of the element opposite the end wall 44. The annular wall 43 is fabricated of a porous material to provide communication between the chamber 46 and the exterior of the element 41. In the preferred embodiment, this wall is fabricated of a plurality of boro-silicate glass beads having a diameter less than the thickness of the annular wall. These beads are fused together, with the interstices between adjacent beads forming flow passageways through which gas passes in the form of bubbles having a diameter on the order of 5 to 30 microns.

The dispersion element 41 includes a neck portion 47 of reduced diameter proximate its open end. This neck portion extends inside the discharge end 37 of the flexible hose 34 and is formed to include an outwardly extending annular rib 48. A clamp 49 provides means for securing the end of the hose to the neck portion of the dispersion element.

The framework 42 includes a pair of cylindrical end members 51, 52 disposed coaxially of the cylindrical dispersion element 41. These members are fabricated of a rigid material which is not adversely affected by chlorine gas. In the preferred embodiment, they are fabricated of a synthetic resin commonly known by the trademark Bakelite. Other suitable materials include brass, plexiglas, and teflon.

The end member 51 is formed to include a blind axial bore defining a recessed portion 53 adapted for receiving the closed end of the dispersion element. A layer of resilient material 54, such as silcon rubber, is disposed in the recess to provide cushioning between the end member and dispersion element.

The second end member 52 is formed to include a through axial bore 56 having a diameter corresponding to the outer diameter of the hose 34. The end member 52 is disposed between the annular rib 48 and the open end of the dispersion element, with the hose 34 and neck portion 47 extending through the bore 56. A plurality of circumferentially spaced apart threaded members 57 extend between the end members 51, 52. These threaded members are provided with nuts 58 for drawing the end members together and clamping the hose 34 between the second end member 52 and the annular rib 58, forming an additional seal between the hose and dispersion element.

The distribution means 16 includes means forming a first flow passage 61 communicating with the source of chlorine gas 12 and the delivery tube means 14. The means forming this flow passage is preferably fabricated of a material, such as brass tubing, which is not deteriorated by dry chlorine gas. The distribution means also includes means forming a second flow passage 62 which provides communication between the carbon dioxide source 13 and the delivery tube means 14.

A conventional tank valve 63 is mounted on the source 12 and provides means for controlling the flow of chlorine gas in the flow passage 61. In the preferred embodiment, this valve is fabricated of brass and is provided with valve seats made of a fluoro carbon plastic, similar to teflon, having a strong resistance to chlorine gas. A conventional tank valve 64 is likewise mounted on the source 13 for controlling the flow of carbon dioxide in the flow passage 62. These valves provide means for successively delivering chlorine gas and carbon dioxide to the dispersion head for, respectively, chlorinating water and purging the system of chlorine gas.

Means is provided for regulating the pressure of the chlorine gas delivered to the dispersion head 15. In the preferred embodiment, this means includes a restrictive orifice 66 which is provided in the flow passage 61. As can be seen in FIG. 3, the means forming the flow passage 61 includes an adapter member 67 threadedly secured to the outlet portion 68 of the chlorine tank valve 63 by means of a nut 69. The adapter member 67 includes an axially extending bore 71 in which a teflon member 72 is threadedly mounted. The restrictive orifice 66 extends axially through the teflon member 72 and has a diameter on the order of 0.025 inch. The orifice has a length on the order of seven-eighths inch, and it provides a relatively constant pressure on the order of 7 to 12 p.s.i. in the flow passage 61.

Means is also provided for regulating the pressure of the carbon dioxide which is delivered to the dispersion head. In the preferred embodiment, this means includes a conventional diaphragm-type gas regulator connected to the outlet of the carbon dioxide tank valve 64. Alternatively, if desired, other types of regulators such as restrictive orifices and capillary tubes can be used for regulating the pressure of the carbon dioxide In addition, a tube filled with small glass beads or other finely divided particles of inert material can be disposed in the flow passages to regulate the pressure of either the chlorine or the carbon dioxide.

A conventional valve 74 is connected to the outlet of the regulator 73, and an additional valve 76 is provided toward the discharge end of the flow passage 62 to prevent chlorine gas from entering the flow passage 62 and damaging the regulator 73. A conventional valve 77 is provided at the inlet end of the delivery tube 14 to prevent moisture from entering the flow passages 61, 62, when the system is not in use. In the preferred embodiment, each of the valves 63, 64, 74, 76, and 77 is provided with a handle of a different color to simplify operation of the system.

Means is provided for discouraging and/or preventing tampering with the chlorine tank valve 63 and the restrictive orifice 66. This means includes a bell shaped cover member 81 adapted to be removably mounted over the valve stem 82 and gland nut 83. A locking chain 84 is attached to the cover 81 and adapted to be wrapped around the adapter member 67 and secured in place by a lock 86. A removable handle 87 is provided for engaging the valve steam 82 and operating the valve 63 when the cover member 81 is removed. Tampering is further discouraged by means of a sealing wire 88 which is passed through openings formed in the gland nut 83 and adapter nut 69, with the ends of this wire being joined together by a lead seal 89.

Operation and use of the portable embodiment of the chlorinating apparatus can now be described briefly as follows. Initially, let it be assumed that all of the valves 63, 64, 73, 74, 76, and 77 are closed. The dispersion head 15 and flexible hose 34 are submerged in the deep end of a swimming pool. The valve 63 is opened, and chlorine gas is permitted to enter the flow passage 61. The valve 77 is opened, and the chlorine gas flows through the delivery tube and dispersion head. When the desired concentration of chlorine in the pool is obtained, the valve 63 is closed, and the chlorination phase of the operation is completed. The valves 64 and 74 are then opened, and carbon dioxide flows into the passage 62. The valve 76 is opened, and carbon dioxide is permitted to flow through the delivery tube and dispersion head for a period on the order of 30 seconds to purge these elements of chlorine gas. Thereafter, the valves 64, 74, 76, and 77 are closed, and the hose and dispersion head are removed from the pool. The hose can then be coiled up and hung on the hanger 31.

If a portable unit is not desired, the sources 12 and 13 can be mounted in a stationary location, and a hose 34 can be provided having sufficient length to extend from the sources to the pool.

FIG. 5 illustrates a second embodiment of the invention wherein water from a swimming pool is chlorinated as it passes through the pool's filter system. This system includes a pump 101 adapted for removing water from a swimming pool 102 and circulating this water through a filter 103 and back into the pool through a return line 104. In this embodiment, the dispersion element 41 is mounted directly in the return line 104, and the framework 42 is not used. The remainder of the system is generally similar to that illustrated at FIG. 1, except that the sources 12 and 13 can be permanently mounted near the filter, and the dolly 11 is not necessary.

FIG. 6 shows a third embodiment of the invention which includes means for chlorinating fresh water which is to be added to the swimming pool. This embodiment includes a canister 111 having a cylindrical side wall 112, a bottom wall 113, and a top wall 114 enclosing a hermetically sealed chamber 116. The canister walls are fabricated of a chlorine and acid resistant material, such as polyvinyl chloride. The dispersion element 41 is disposed coaxially within the chamber 116. An opening 117 is provided in the bottom wall 113, and the discharge end 37 of the hose 34 extends through this opening. Conventional sealing means 118 provides a seal between the bottom wall and the outer portion of the hose. The hose 34 is connected for successively delivering chlorine gas and carbon dioxide to the dispersion element in the manner indicated in FIG. 4.

An inlet orifice 121 is provided in the lower portion of the canister 111. This orifice includes a flow passageway communicating with the chamber 116 and is adapted for receiving fresh water from a conventional pressurized source, such as a garden hose.

An outlet orifice 122 is provided in the upper portion of the canister 111 and includes a flow passageway communicating with the chamber 116. A flexible hose 123 is connected to the orifice 122 for delivering chlorinated water to the swimming pool. Alternatively this hose can be connected to the return line from the filter system to the pool.

Operation of the embodiment shown in FIG. 6 can now be described briefly as follows. Let it be assumed that the inlet orifice 121 has been connected to a source of fresh water, such as conventional water faucet. The chamber 116 is allowed to fill until water begins to flow to the swimming pool through the flexible hose 123. The chlorine gas is then turned on in the manner hereinbefore described and passes through the dispersion element 41 to provide chlorination of the water flowing through the chamber 116. When the desired degree of chlorination has been obtained, the chlorine gas is turned off, and the carbon dioxide is turned on to purge the system. When the chlorine gas has been expelled, the carbon dioxide is turned off, and then the water is turned off. The water is then permitted to drain out of the chamber 116 through the inlet orifice 121.

The embodiment shown in FIG. 6 can be incorporated in either a portable or a stationary system. In a portable system, the canister 111 is mounted on the dolly 11, whereas in a stationary system it is mounted adjacent the sources 12 and 13.

It is apparent from the foregoing that a new and improved method and apparatus for adding chlorine gas to swimming pool water have been provided. This method and apparatus are simple and safe in operation and are particularly suitable for use by home owners. While only the presently preferred embodiments have been described herein, it will be apparent to those familiar with the art that certain changes and modifications can be made without departing from the scope of the invention as defined by the following claims.

I claim:

1. In portable apparatus for chlorinating swimming pools, a wheeled vehicle, a pressurized source of chlorine gas carried by said vehicle, a pressurized source of another gas carried by said vehicle, a flexible hose having inlet and discharge ends, means forming a flow passage between the source of chlorine gas and the inlet end of said hose, valve means for controlling the flow of chlorine gas through said flow passage to said hose, means forming a flow passage between the source of the other gas and the inlet end of said hose, valve means for controlling the flow of said other gas through the last named flow passage to said hose, and a dispersion head connected to the discharge end of said hose, said hose being coiled and carried by said vehicle when the apparatus is not in use and having a length sufficient to permit the dispersion head to be submerged in a swimming pool when said hose is uncoiled.

2. Apparatus as in claim 1 wherein said other gas is selected from the group consisting of carbon dioxide, nitrogen, freon and air.

3. Apparatus as in claim 1 together with means forming a restrictive orifice in the flow passage between the source of chlorine gas and the inlet end of the hose for regulating the pressure of the chlorine gas delivered to said hose.

4. In portable apparatus for chlorinating swimming pools, a movable support, a pressurized source of chlorine gas carried by said support, a pressurized source of another gas carried by said support, a flexible hose having inlet and discharge ends, means forming a flow passage between the source of chlorine gas and the inlet end of said hose, valve means for controlling the flow of chlorine gas through said flow passage to said hose, means forming a flow passage between the source of the other gas and the inlet end of said hose, valve means for controlling the flow of said other gas through the last named flow passage to said hose, said hose being coiled and carried by said support when not in use, and a dispersion head connected to the discharge end of said hose and carried by said support when said hose is coiled, said hose having a length sufficient to permit the dispersion head to be submerged in a swimming pool when uncoiled.

5. Portable apparatus as in claim 4 wherein the other gas is selected from the group consisting of carbon dioxide, nitrogen, freon and air.

* * * * *